United States Patent [19]

Buzzi et al.

[11] Patent Number: 5,097,577

[45] Date of Patent: Mar. 24, 1992

[54] MACHINE WITH INTERMITTENTLY ROTARY WORKPIECE-HOLDING TABLE FOR WORKING AND ASSEMBLY OF HIGH-PRECISION PIECES

[75] Inventors: Ugo Buzzi, Arzo, Switzerland; Giulio Borlin, Azzate, Italy

[73] Assignee: Mikron S.A., Agno, Switzerland

[21] Appl. No.: 620,217

[22] Filed: Nov. 30, 1990

[30] Foreign Application Priority Data

Jan. 12, 1990 [CH] Switzerland .................... 99/90

[51] Int. Cl.⁵ .................... B23P 19/04; B23B 39/20
[52] U.S. Cl. .................... 29/38 R; 29/38 A; 29/38 C
[58] Field of Search .................... 29/38 R, 38 A, 38 B, 29/38 C, 38 D, 37 R, 37 A, 36, 563, 33 P, 33 R

[56] References Cited

U.S. PATENT DOCUMENTS 3,689,965 9/1972 Bertoglio .................... 29/38 C
4,862,569 9/1989 Buzzi .................... 29/38 C

FOREIGN PATENT DOCUMENTS 83304 7/1983 European Pat. Off. .................... 29/38 A Primary Examiner—William Briggs
Attorney, Agent, or Firm—Young & Thompson

[57] ABSTRACT

An intermittently rotary workpiece-holding table has operating units that move vertically relative to the table. The operating units are controlled by vertically swinging levers that are driven vertically at one end and at their other ends control the operating units. The levers pivot about fulcrums, each lever having two fulcrums spaced apart along its length. During a first portion of movement of the lever, that fulcrum is operative which gives the most rapid vertical movement to the operating unit. Then the first fulcrum becomes inoperative and the second fulcrum becomes operative, whereupon the speed of vertical movement of the operating unit slows, as for example for the performance of a work operation. The same pattern of movement is followed on the return stroke: first there is a relatively slow vertical movement of the operating unit in the opposite direction, followed by a relatively rapid return vertical movement, as the lever pivots successively about the two fulcrums in the reverse order of the initial operation.

2 Claims, 3 Drawing Sheets

MACHINE WITH INTERMITTENTLY ROTARY WORKPIECE-HOLDING TABLE FOR WORKING AND ASSEMBLY OF HIGH-PRECISION PIECES

This invention has as its object a intermittently rotary workpiece-holding table for working and assembly of high-precision pieces.

The machine according to this invention differs from those known by the fact that the operating units are controlled by lever systems and not by cams. Much simplified kinematics a and very restrained production cost result.

The machine according to this invention, which comprises operating units placed above, below and laterally with respect to the rotary table, is characterized in that the control of the advances of the operating units with vertical axes comes about by levers controlled by elements which in turn are driven by a cam having opposite profiles so as to control said elements in the opposite direction, the extent of the movement of said operating units with vertical axes is varied individually by moving the fulcrum of said levers.

Also an object of this invention is a process for the efficient use of said machine, characterized in that, to vary the curve representing the advance of the work unit with respect to the angular movement of the cam, a first fulcrum of the levers is used in a first and last work phase and a second fulcrum of said levers is used in a second time.

The accompanying drawings represent a preferred nonlimiting embodiment of said machine.

Figure 1:
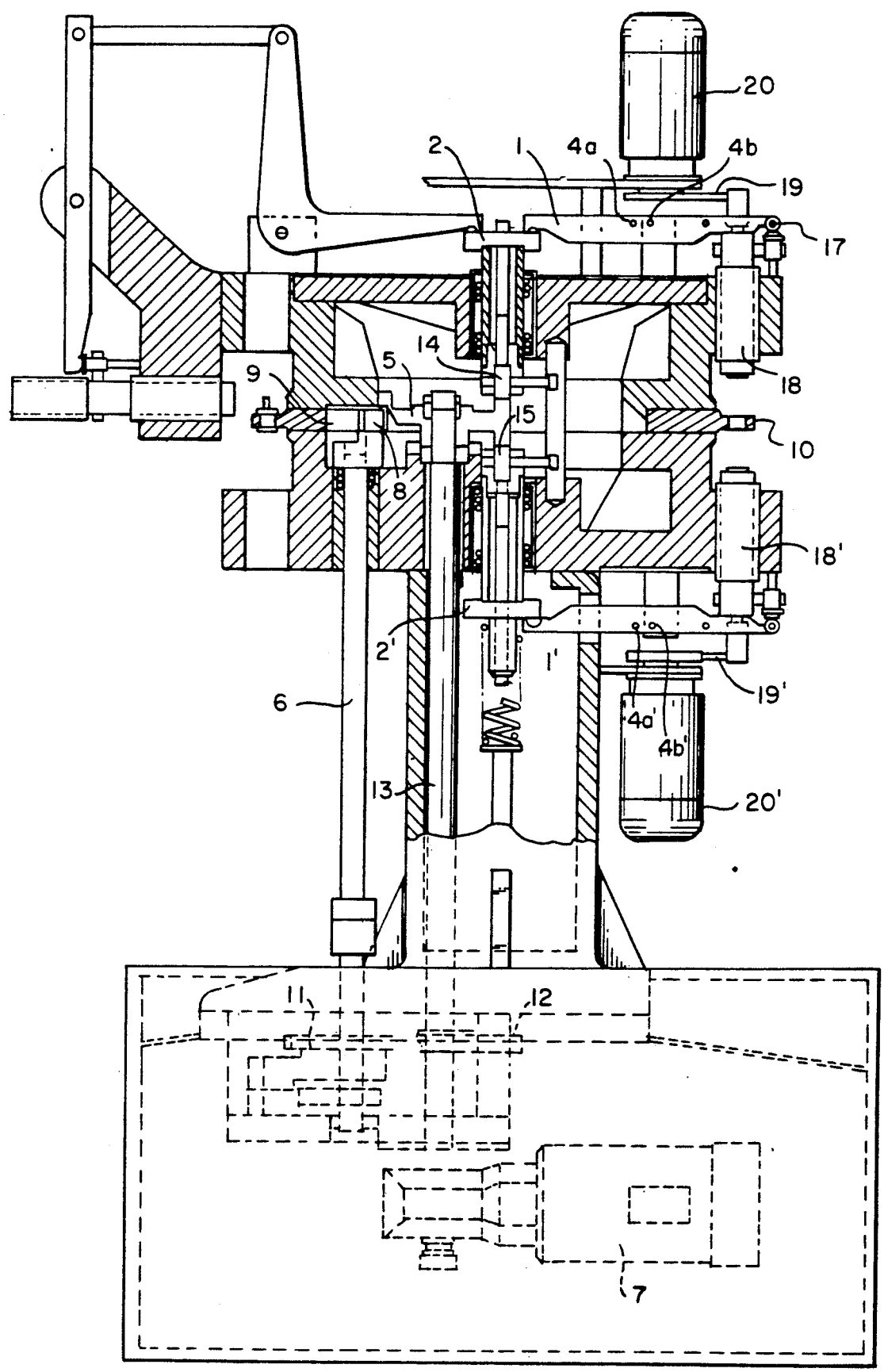
FIG. 1 is a side elevational view, with parts broken away, showing a machine according to the present invention.
Figure 2:
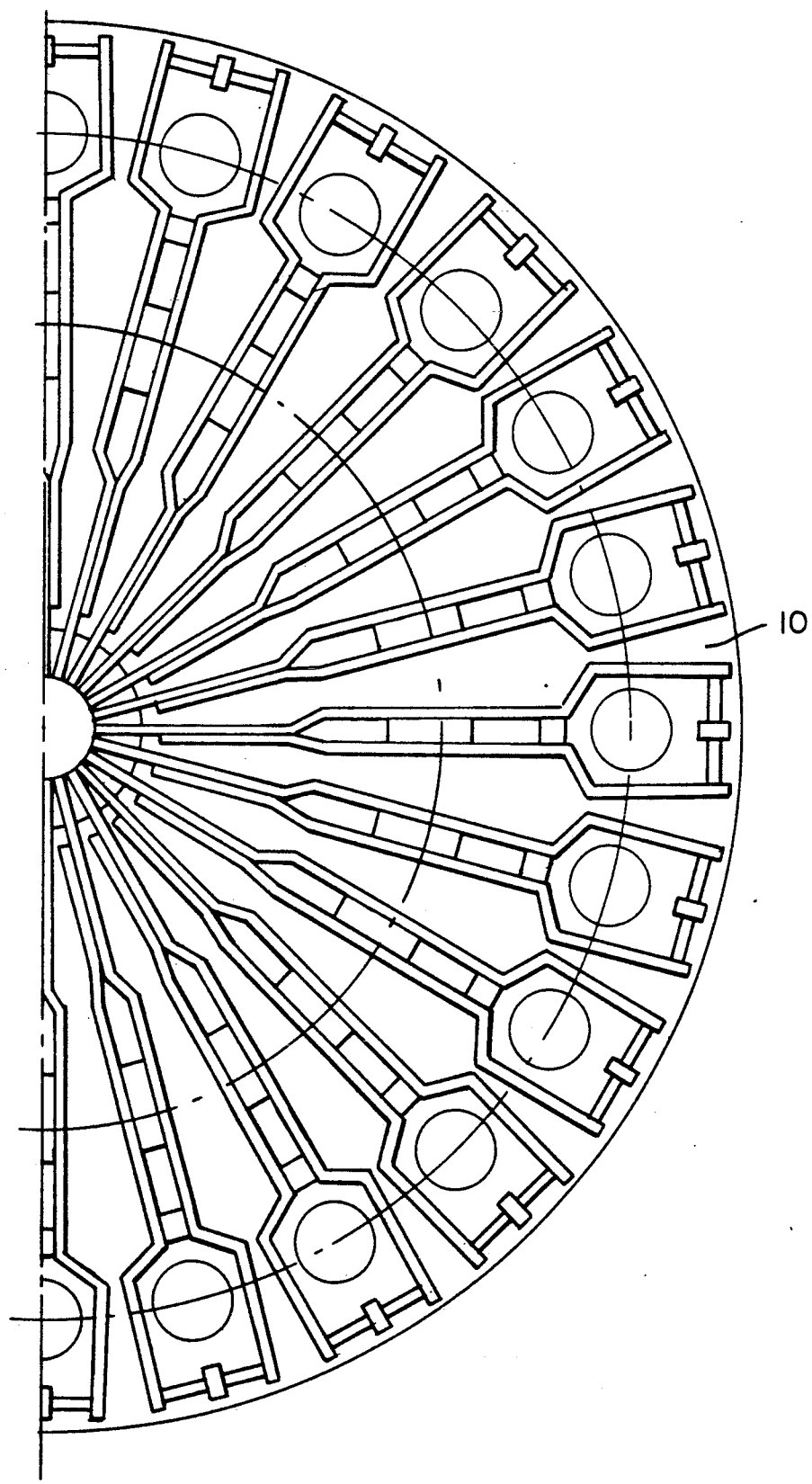
FIG. 2 is a partial top plan view thereof.

Shaft 6, connected to motor 7 by gears 11 and 12, controls Geneva movement 8, 9, which transforms the continuous rotary movement into an intermittent movement to drive workpiece table 10. A second shaft 13 driven by motor 7 carries a cam 5 which drives disks 2 and 2' by rollers 14, 15.

Cam 5 exhibits two opposite profiles so that disks 2,2' are moved in opposite direction.

Figure 3:
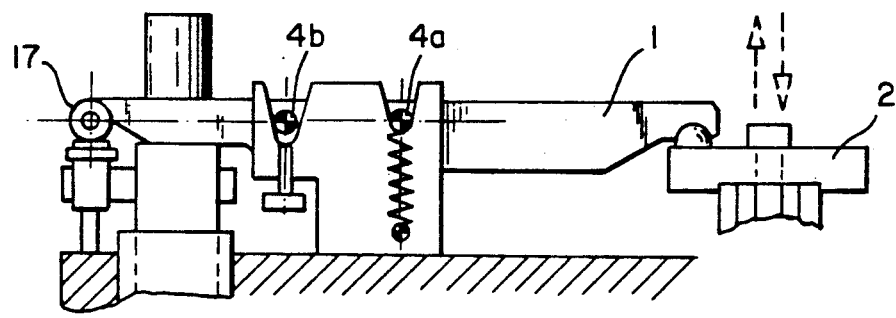
FIG. 3 is an enlarged fragmentary elevational view of a portion thereof, showing the lever swinging about one of the two fulcrums.
Figure 4:
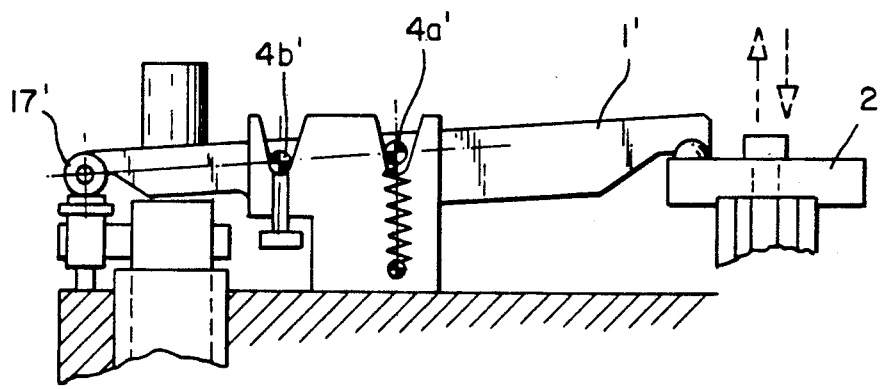
FIG. 4 is a view similar to FIG. 3, but showing the lever swinging about the other of the two fulcrums.

Said disks act on levers 1, 1' which in turn control, by pawls 17, 17' (see also FIGS. 3 and 4), the operating units with vertical axes 18, 18'. Operating units 18, 18' in turn are driven by belts 19, 19' by motors 20, 20' or can be equipped with incorporated motors. The extent of the advances can be varied individually for each operating unit, by moving fulcrums 4a, 4a'–4b, 4b' of levers 1,1'.

Figure 5:
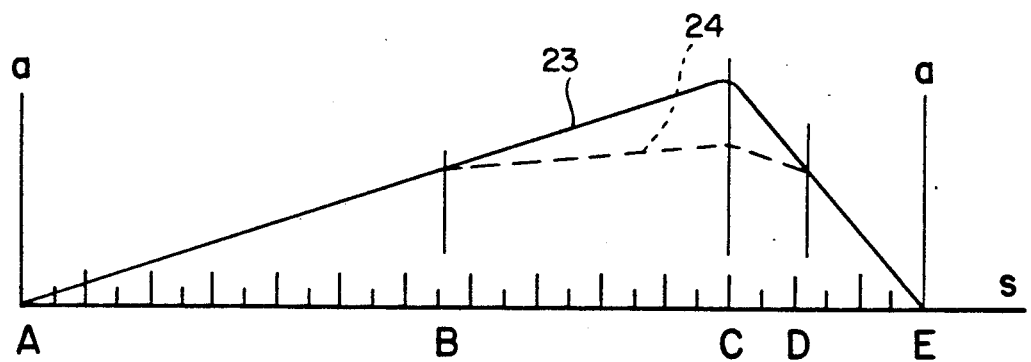
FIG. 5 is a graph of speed of vertical movement versus time.

For the efficient use of said machine, it is provided to vary curve 23 (FIG. 5) which represents advance "a" of the work units, with respect to angular movement "s" of cam 5 (FIG. 1), according to curve 24, by using in a first and last work phase (AB-DE, FIG. 5) first fulcrum 4a, 4a' and in a second work phase (BD) a second fulcrum 4b, 4b' of said levers 1, 1', while the first fulcrum is removed from its support. Thus, for a constant speed of vertical movement of disk 2 or 2' in one direction, the pawl 17 to 17' will have a first relatively rapid vertical movement when fulcrum 4a or 4a' is operative and a second relatively slow vertical movement in the same direction when 4a or 4a' moves from the FIG. 3 to the FIG. 4 position and 4b or 4b' becomes the operative fulcrum. For movement of 2 or 2' in the opposite direction, the path C-D-E in FIG. 5 is followed, which is the reverse of path A-B-C just described.

We claim:

1. Machine comprising an intermittently rotating workpiece-holding table, operating units movable vertically to perform work operations on workpieces held by the table, levers that swing vertically to move the operating units vertically toward and away from the workpieces, control elements for moving vertically ends of the levers opposite the operating units, and two fulcrums for each lever spaced apart lengthwise of the lever, one of said fulcrums being operative during a predetermined portion of vertical swinging movement of the associated lever to move the associated operating unit at a first vertical velocity, and the other fulcrum being operative during a second predetermined portion of the vertical swinging movement of the associated lever to move the associated operating unit at a second velocity different from the first-mentioned velocity.

2. Machine as claimed in claim 1, wherein said levers and fulcrums are so disposed that said operating units are moved with a cycle of vertical movement comprising a first relatively rapid vertical movement of the operating unit toward the associated workpiece, followed by a relatively slow movement of the operating unit toward and away from the workpiece upon shifting from the first fulcrum to the second fulcrum, followed again by a relatively rapid movement of the operating unit away from the workpiece upon shifting from the second fulcrum back to the first fulcrum.

* * * * *